No. 721,629. PATENTED FEB. 24, 1903.
L. WELLS.
MILK COOLER AND AERATOR.
APPLICATION FILED APR. 21, 1902.
NO MODEL.
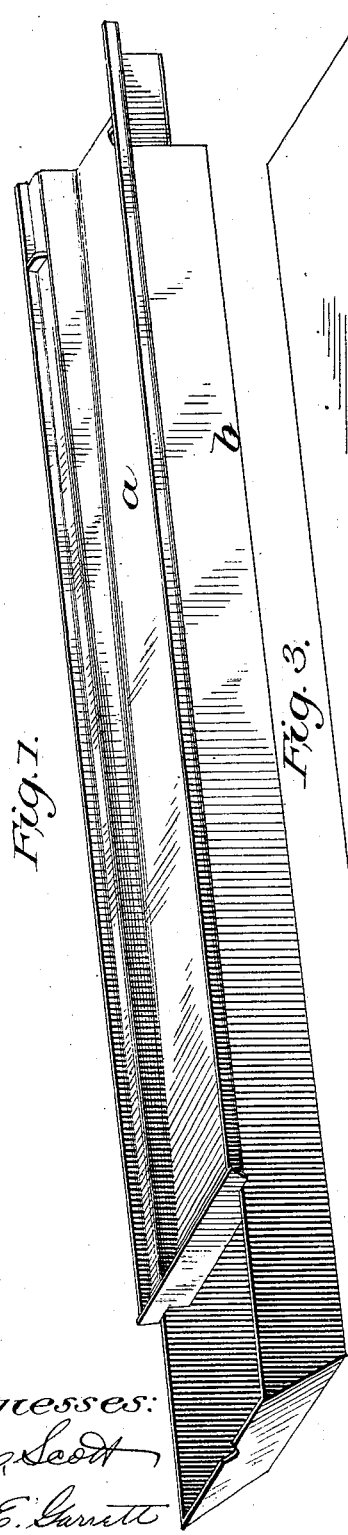
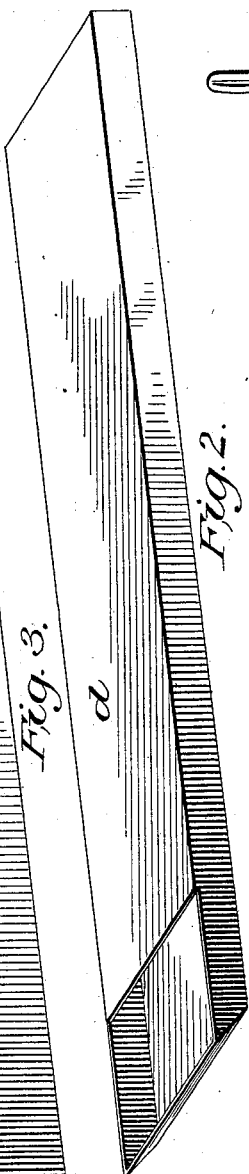
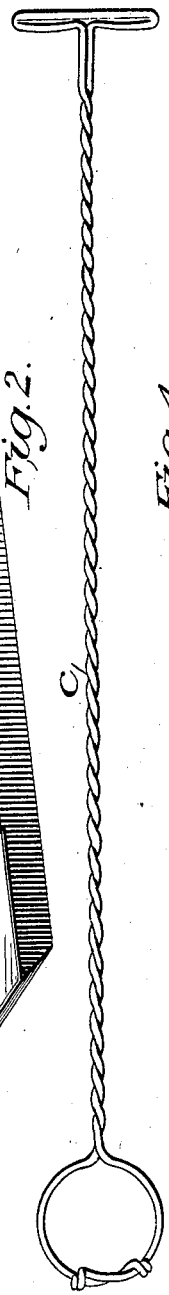
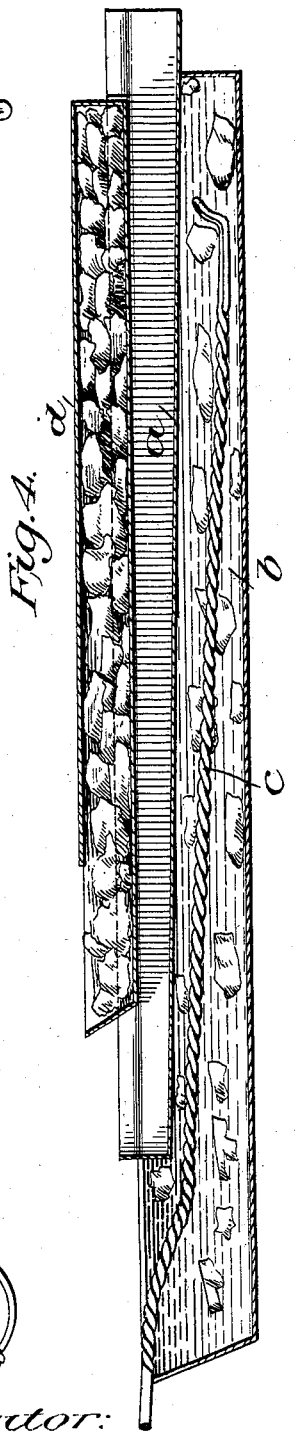

UNITED STATES PATENT OFFICE.

LEVI WELLS, OF SPRINGHILL, PENNSYLVANIA.

MILK COOLER AND AERATOR.

SPECIFICATION forming part of Letters Patent No. 721,629, dated February 24, 1903.

Application filed April 21, 1902. Serial No. 104,085. (No model.)

*To all whom it may concern:*

Be it known that I, LEVI WELLS, a citizen of the United States, and a resident of Springhill, in the county of Bradford, State of Pennsylvania, have invented a certain new and useful Improvement in Milk and Cream Coolers and Aerators, adapted to cooling milk and also cream as it flows from the separator to the can or vat or any other receptacle; and I hereby declare the following to be a full, clear, and exact description of the invention.

Figure 1 is the lower section, being a conductor and cooler. Fig. 2 is an agitator to be used in the same. Fig. 3 is the top and refrigerating section of the device. Fig. 4 is a section of the whole device.

$a$ represents the flat surface placed at an incline over which the milk or cream flows and is also the top of a rectangular inclosure. $b$ represents one of the sides of this inclosure, which, together with the bottom and opposite side, extends (at the elevated end) enough beyond the top $a$ to admit filling the space below the conducting-surface with broken ice and water. The lower end of this cavity is closed to prevent the escape of the cooling material with which it is filled.

The agitator $c$ is for the purpose of occasionally stirring the ice and water beneath the cooling-surface of the conductor $a$ in order that its temperature may be maintained nearly as low as the water and ice beneath.

$d$ represents the rectangular receptacle for broken ice and salt which when the conductor is being operated is placed over the same, thus forming an inclosed space through which the milk or cream flows, the bottom surface of which is cooled by ice and water and the top being a refrigerating-surface on which frost is formed by the action of the salt on the ice contained therein.

Having thus described the invention, what is claimed as new is—

1. In a cream cooler and aerator, the combination with a lower tank for ice, a vessel for the cream projecting beyond one end of said lower tank but not reaching to the other end, the said cream vessel having a sloping bottom, of an ice-receptacle forming a partial top for said cream-tank but having an open space at one end thereof, substantially as described.

2. In a cream cooler and aerator, the combination with a lower tank for ice with an agitator therein, a vessel for the cream projecting beyond one end of said lower tank but not reaching to the other end, the said cream vessel having a sloping bottom, of an ice-receptacle forming a partial top for said cream-tank but having an open space at one end thereof, substantially as described.

LEVI WELLS.

Witnesses:
GUY W. WELLS,
J. B. EDWARDS.